United States Patent
Mitchell et al.

(10) Patent No.: US 11,499,032 B2
(45) Date of Patent: Nov. 15, 2022

(54) CURABLE FLUOROPOLYMER COMPOSITIONS COMPRISING A COMPOUND CONTAINING A PHTHALONITRILE AND AN OLEFINIC BOND AND CURED ARTICLES THEREFROM

(71) Applicant: 3M INNOVATIVE PROPERTIES COMPANY, St. Paul, MN (US)

(72) Inventors: Michael H. Mitchell, Edina, MN (US); Benjamin J. Anderson, Eden Prairie, MN (US); Gregg D. Dahlke, St. Paul, MN (US); Tatsuo Fukushi, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 17/626,215

(22) PCT Filed: Aug. 18, 2020

(86) PCT No.: PCT/IB2020/057772
§ 371 (c)(1),
(2) Date: Jan. 11, 2022

(87) PCT Pub. No.: WO2021/038384
PCT Pub. Date: Mar. 4, 2021

(65) Prior Publication Data
US 2022/0251338 A1 Aug. 11, 2022

Related U.S. Application Data

(60) Provisional application No. 62/890,817, filed on Aug. 23, 2019.

(51) Int. Cl.
| | | |
|---|---|---|
| *C08K 5/372* | (2006.01) | |
| *C08K 5/3477* | (2006.01) | |
| *C08F 214/26* | (2006.01) | |
| *C08K 5/14* | (2006.01) | |
| *C08K 5/06* | (2006.01) | |
| *C08K 5/29* | (2006.01) | |

(52) U.S. Cl.
CPC .......... *C08K 5/372* (2013.01); *C08F 214/267* (2013.01); *C08K 5/06* (2013.01); *C08K 5/14* (2013.01); *C08K 5/29* (2013.01); *C08K 5/3477* (2013.01)

(58) Field of Classification Search
None
See application file for complete search history.

(56) References Cited

U.S. PATENT DOCUMENTS

| | | |
|---|---|---|
| 5,225,504 A | 7/1993 | Tatsu |
| 6,191,233 B1 | 2/2001 | Kishine |
| 8,138,271 B2 | 3/2012 | Washino |
| 2011/0152487 A1 | 6/2011 | Cook |
| 2018/0013553 A1 | 1/2018 | Hassan |
| 2018/0155276 A1 | 6/2018 | Kim |
| 2018/0194888 A1 | 7/2018 | Mitchell |
| 2019/0352444 A1 | 11/2019 | Mitchell |

FOREIGN PATENT DOCUMENTS

| | | | | |
|---|---|---|---|---|
| CN | 112778525 A | * | 5/2021 | |
| JP | 6802164 B2 | * | 12/2020 | ................ C08J 3/24 |
| WO | WO 2018-136331 | | 7/2018 | |
| WO | WO 2018-175025 | | 9/2018 | |
| WO | WO-2020121125 A1 | * | 6/2020 | .......... C08F 214/184 |
| WO | WO-2020245683 A1 | * | 12/2020 | .......... C08K 5/0025 |

OTHER PUBLICATIONS

Beck, "Synthese vo Tetravinylphthalocyanin", Chem. Ber. 1993, vol. 126, pp. 1493-1494.
International Search report for PCT International Application No. PCT/IB2020/057772 dated Nov. 13, 2020, 4 pages.

* cited by examiner

*Primary Examiner* — Nicole M. Buie-Hatcher
(74) *Attorney, Agent, or Firm* — Julie Lapos-Kuchar

(57) ABSTRACT

Described herein are fluoropolymer compositions comprising a compound of Formula (I) wherein $X^1$ is selected from O or S; L is a divalent linking group comprising at least one aromatic ring; O and $X^2$ comprises a carbon-carbon double bond. In one embodiment, the phthalonitrile-containing compound is added to a composition comprising (i) a fluorinated elastomeric gum, wherein the fluorinated elastomeric gum comprises a fluoropolymer having a cure-site and (ii) a peroxide curing system.

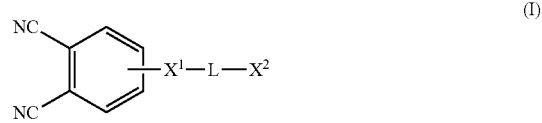

(I)

16 Claims, No Drawings

CURABLE FLUOROPOLYMER COMPOSITIONS COMPRISING A COMPOUND CONTAINING A PHTHALONITRILE AND AN OLEFINIC BOND AND CURED ARTICLES THEREFROM

TECHNICAL FIELD

A compound comprising a phthalonitrile group and an olefinic bond is described for use in the curing of curable fluoropolymers.

SUMMARY

There is a desire to identify novel curing systems for fluoropolymers, which are more environmentally friendly, and have improved properties, such as improved resistance to heat aging, tensile strength, and/or elongation at break.

In one aspect, a curable composition is described comprising (a) a fluorinated elastomeric gum comprising a fluoropolymer, wherein the fluoropolymer comprises at least one of —I, —Br, and —CN cure site, (b) a peroxide curing system comprising a peroxide and a coagent, and (c) a compound of Formula I

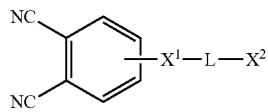

wherein $X^1$ is selected from O or S; L is a divalent linking group comprising at least one aromatic ring; and $X^2$ comprises a carbon-carbon double bond.

In another aspect, a curable composition is described comprising (a) a fluorinated elastomeric gum, wherein the fluorinated elastomeric gum comprises a fluoropolymer, and wherein the fluoropolymer comprises at least one of —I, —Br, and —CN cure site, (b) a peroxide curing system comprising a peroxide and a coagent, and (c) a compound of Formula I

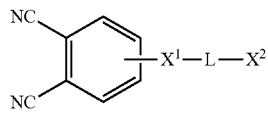

wherein $X^1$ is selected from O or S; L is a divalent linking group comprising at least one aromatic ring; and $X^2$ comprises a carbon-carbon double bond.

In one aspect, the curable composition from above is cured to form an article such as an o-ring, a seal, a gasket, a hose, or a sheet.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B);

"backbone" refers to the main continuous chain of the polymer;

"crosslinking" refers to connecting two pre-formed polymer chains using chemical bonds or chemical groups;

"cure site" refers to functional groups, which may participate in crosslinking;

"interpolymerized" refers to monomers that are polymerized together to form a polymer backbone;

"monomer" is a molecule which can undergo polymerization which then forms part of the essential structure of a polymer;

"perfluorinated" means a group or a compound derived from a hydrocarbon wherein all hydrogen atoms have been replaced by fluorine atoms. A perfluorinated compound may however still contain other atoms than fluorine and carbon atoms, like oxygen atoms, chlorine atoms, bromine atoms and iodine atoms; and "polymer" refers to a macrostructure having a number average molecular weight (Mn) of at least 30,000 dalton, at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

As used herein, and known in the art, a line intersecting a bond of an aromatic ring, such as shown in this structure

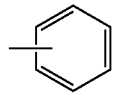

represents a bond that is attached to any one of the unsubstituted carbon atoms of the ring.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

As used herein, "comprises at least one of" A, B, and C refers to element A by itself, element B by itself, element C by itself, A and B, A and C, B and C, and a combination of all three.

The present disclosure is directed toward compounds containing a phthalonitrile group and a nucleophilic functional group. These compounds can be used in curable fluoropolymer compositions as an additive, a curing agent, and/or a curing coagent.

Phthalonitrile-Containing Compound

The phthalonitrile-containing compounds of the present disclosure are according to Formula (I):

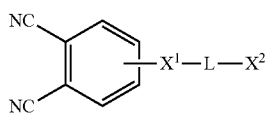

wherein $X^1$ is selected from O or S; L is a divalent linking group comprising at least one aromatic ring; and $X^2$ comprises a carbon-carbon double bond.

L is a divalent linking group, which comprises at least one 5 or 6-membered aromatic ring (i.e., comprising 5 or 6 atoms in a ringed structure). In one embodiment, L comprises at least 2 aromatic rings. In one embodiment, additional substituents (such as alkyl, alkoxy, halogen, another aromatic group) are present off the aromatic ring.

L may comprise other atoms besides carbon and hydrogen atoms such as oxygen and nitrogen, however, L is non-functional, meaning that L does not contain any groups, which will react during the curing of the fluoropolymer.

In one embodiment, L is a phenylene or substituted phenylene. For example, in one embodiment, L is

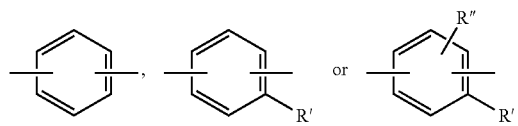

where the two horizontal lines in each structure represent (i) a bond between one vertex of the aromatic ring and $X^1$ and (ii) a bond between a different vertex of the aromatic ring and $X^2$. These two bonds may be ortho, meta, or para to each other. In addition to these two bonds, there may be other non-functional groups bonded to the aromatic ring, such as shown by R' and R" above, which do not cause steric hindrance, such non-functional groups include short chain (e.g., C1-C4) alkyl and alkoxy groups. Exemplary R' and R" groups include: methyl, methoxy, ethyl, and ethoxy groups.

In another embodiment, L comprises more than one aromatic group, such as naphthalene, anthracene, phenantherene, or a divalent group of the following structure:

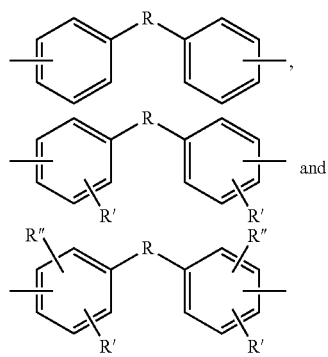

where R is selected from the group consisting of —S—, —O—, —C(CF$_3$)$_2$—, —C(CH$_3$)$_2$—, —CH$_2$—, —SO$_2$—, —C(=O)—, and —C(CH$_3$)$_2$—C$_6$H$_4$—C(CH$_3$)$_2$—. In the above structure for L, the bonds linking L to $X^1$ and $X^2$ of the phthalonitrile-containing compound can be in any position with respect to the R group. For example, the bonds to $X^1$ and $X^2$ can independently be ortho, meta, or para to the R group. More preferably, the bonds to $X^1$ and $X^2$ are either both ortho, both meta, or both para with respect to the R group. In addition to the two bonds between the phenylene and $X^1$, and the phenylene and R, there may be other non-functional groups bonded to the phenylene, which do not cause steric hindrance, such non-functional groups include short chain (e.g., C1-C4) alkyl and alkoxy groups. Exemplary R' and R" groups include: methyl, methoxy, ethyl, and ethoxy groups.

In another embodiment, L is a divalent 5-membered aromatic group selected from at least one of a pyrrole, a furan, an imidazole, a pyridine, a thiophene, oxazole, isoxazole, isothiazole, thiazole, and combinations thereof.

$X^2$ comprises a carbon-carbon double bond (or olefin). $X^2$ may be linear or branched and comprises at least 2, 3, or even 4 carbon atoms and at most 5, 6, 8, 10, or even 12 carbon atoms. In one embodiment, the carbon-carbon double bond is terminal, meaning —CZ=CH$_2$, where Z is an atom or group such as —H, —CH$_3$, etc.

In one embodiment, $X^2$ is —CH=CH$_2$, —CH$_2$CH=CH$_2$, —OCH=CH$_2$, —OCH$_2$CH=CH$_2$, —OCH$_2$C(CH$_3$)=CH$_2$, —C(CH$_3$)=CH$_2$, —CH$_2$CH=CHCH$_3$.

In one embodiment -L-$X^2$ is

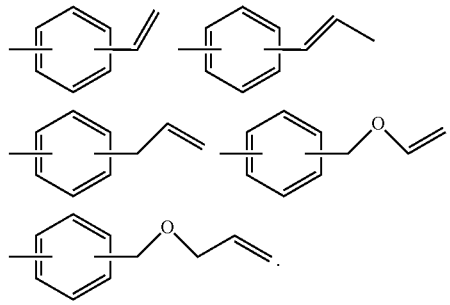

In one embodiment, -V-L-$X^2$ is

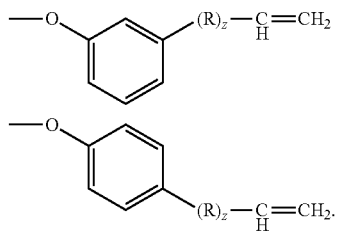

when z is 0 or 1 and R is independently selected from a divalent C1-C6 alkylene group. Exemplary C1-C6 alkylene groups include —(CH$_2$)—, —(CH$_2$)$_2$—, —(CH$_2$)$_3$—, —(CH$_2$)$_4$—, —(CH$_2$)$_5$—, —(CH$_2$)$_6$—, —(CH$_2$CH(CH$_3$))—, —(CH$_2$CH(CH$_3$)CH$_2$)—, and —(CH$_2$CH$_2$CH(CH$_3$)CH$_2$CH$_2$)—.

Exemplary compounds of Formula (I) include:

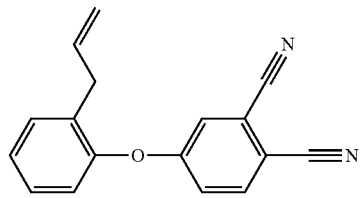 [SMILES: C=CCc1ccccc1Oc1ccc(C#N)c(C#N)c1]

-continued

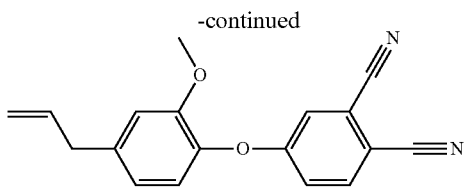

Curable Composition

In one embodiment of the present disclosure, the phthalonitrile-containing compound of Formula I is combined with a fluorinated elastomeric gum. The fluorinated elastomeric gum comprises a fluorinated polymer wherein the fluorinated polymer comprises a cure-site (I, Br, and/or CN). The mixture (i.e., the phthalonitrile-containing compound and the fluorinated elastomeric gum) is subsequently cured to form a fluoroelastomer.

In one embodiment, the fluorinated polymer contains cure sites which facilitate crosslinking of the fluorinated polymer in appropriate cure systems. These cure sites comprise at least one of iodine, bromine, and/or nitrile. The fluorinated polymer may be polymerized in the presence of a chain transfer agent and/or cure site monomer to introduce cure sites into the polymer. Such cure site monomers and chain transfer agents are known in the art. Exemplary chain transfer agents include: an iodo-chain transfer agent, a bromo-chain transfer agent, or a chloro-chain transfer agent. For example, suitable iodo-chain transfer agent in the polymerization include the formula of Rh, where (i) R is a perfluoroalkyl or chloroperfluoroalkyl group having 3 to 12 carbon atoms; and (ii) x=1 or 2. The iodo-chain transfer agent may be a perfluorinated iodo-compound. Exemplary iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutan, and mixtures thereof. In some embodiments, the iodo-chain transfer agent is of the formula I $(CF_2)_n$—O—$R_f$—$(CF_2)_m$I, wherein n is 1, 2, 3, 4, 5, 6, 7, 8, 9, or 10, m is 1, 2, 3, 4, 5, 6, 7, 8, 9, or 10 and $R_f$ is a partially fluorinated or perfluorinated alkylene segment, which can be linear or branched and optionally comprises at least one catenated ether linkage.

Exemplary compounds include: I—$CF_2$—$CF_2$—O—$CF_2$—$CF_2$—I, I—$CF(CF_3)$—$CF_2$—O—$CF_2$—$CF_2$—I, I—$CF_2$—$CF_2$—O—$CF(CF_3)$—$CF_2$—O—$CF_2$—$CF_2$—I, I—$(CF(CF_3)$—$CF_2$—O)_2$—$CF_2$—$CF_2$—I—I—$CF_2$—$CF_2$—O—$(CF_2)_2$—O—$CF_2$—$CF_2$—I, I—$CF_2$—$CF_2$—O—$(CF_2)_3$—O—$CF_2$—$CF_2$—I, and I—$CF_2$—$CF_2$—O—$(CF_2)_4$—O—$CF_2$—$CF_2$—I, I—$CF_2$—$CF_2$—$CF_2$—O—$CF_2$—$CF_2$—I, and I—$CF_2$—$CF_2$—$CF_2$—O—$CF(CF_3)$—$CF_2$—O—$CF_2$—$CF_2$—I. In some embodiments, the bromine is derived from a brominated chain transfer agent of the formula: $RBr_x$, where (i) R is a perfluoroalkyl or chloroperfluoroalkyl group having 3 to 12 carbon atoms; and (ii) x=1 or 2. The chain transfer agent may be a perfluorinated bromo-compound.

Cure site monomers, if used, comprise at least one of a bromine, iodine, and/or nitrile cure moiety.

In one embodiment, the cure site monomers may be of the formula: (a) $CX_2$=$CX(Z)$, wherein: (i) X each is independently H or F; and (ii) Z is I, Br, $R_f$-U wherein U=I or Br and $R_f$=a perfluorinated or partially perfluorinated alkylene group optionally containing ether linkages or (b) Y$(CF_2)_q$Y, wherein: (i) Y is independently selected from Br or I or Cl and (ii) q=1-6. In addition, non-fluorinated bromo- or iodo-olefins, e.g., vinyl iodide and allyl iodide, can be used. Exemplary cure site monomers include: $CH_2$=CHI, $CF_2$=CHI, $CF_2$=CFI, $CH_2$=CHCH$_2$I, $CF_2$=CFCF$_2$I, I$CF_2CF_2CF_2CF_2$I, $CH_2$=CHCF$_2CF_2$I, $CF_2$=CFCH$_2CH_2$I, $CF_2$=CFCF$_2CF_2$I, $CH_2$=CH(CF$_2)_6$CH$_2$CH$_2$I, $CF_2$=CFOCF$_2CF_2$I, $CF_2$=CFOCF$_2$CF$_2$CF$_2$I, $CF_2$=CFOCF$_2$CF$_2$CH$_2$I, $CF_2$=CFCF$_2$OCH$_2$CH$_2$I, $CF_2$=CFO(CF$_2)_3$—OCF$_2$CF$_2$I, $CH_2$=CHBr, $CF_2$=CHBr, $CF_2$=CFBr, $CH_2$=CHCH$_2$Br, $CF_2$=CFCF$_2$Br, $CH_2$=CHCF$_2$CF$_2$Br, $CF_2$=CFOCF$_2$CF$_2$Br, $CF_2$=CFCl, I—CF$_2$—CF$_2$CF$_2$—O—CF=CF$_2$, I—CF$_2$—CF$_2$CF$_2$—O—CF$_2$CF=CF$_2$, I—CF$_2$—CF$_2$—O—CF$_2$—CF=CF$_2$, I—CF(CF$_3$)—CF$_2$—O—CF=CF$_2$, I—CF(CF$_3$)—CF$_2$—O—CF$_2$—CF=CF$_2$, I—CF$_2$—CF$_2$—O—CF(CF$_3$)—CF$_2$—O—CF=CF$_2$, I—CF$_2$—CF$_2$—O—CF(CF$_3$)—CF$_2$—O—CF$_2$—CF=CF$_2$, I—CF$_2$—CF$_2$—(O—(CF(CF$_3$)—CF$_2$)_2$—O—CF=CF$_2$, I—CF$_2$—CF$_2$—(O—(CF(CF$_3$)—CF$_2$)_2$—O—CF$_2$—CF=CF$_2$, Br—CF$_2$—CF$_2$—O—CF$_2$—CF=CF$_2$, Br—CF(CF$_3$)—CF$_2$—O—CF=CF$_2$, I—CF$_2$—CF$_2$—CF$_2$—O—CF(CF$_3$)—CF$_2$—O—CF=CF$_2$, I—CF$_2$—CF$_2$—CF$_2$—O—CF(CF$_3$)—CF$_2$—O—CF$_2$—CF=CF$_2$, I—CF$_2$—CF$_2$—CF$_2$—(O—(CF(CF$_3$)—CF$_2$)_2$—O—CF=CF$_2$, I—CF$_2$—CF$_2$—CF$_2$—O—(CF(CF$_3$)—CF$_2$—$(CF_{2-0})_2$—CF$_2$—CF=CF$_2$, Br—CF$_2$—CF$_2$—O—CF=CF$_2$, Br—CF$_2$—CF$_2$—CF$_2$—O—CF$_2$—CF=CF$_2$, I—CF$_2$—CF$_2$—O—(CF$_2)_2$—O—CF=CF$_2$, I—CF$_2$—CF$_2$—O—(CF$_2)_3$—O—CF=CF$_2$, I—CF$_2$—CF$_2$—O—(CF$_2)_4$—O—CF=CF$_2$, I—CF$_2$—CF$_2$—O—(CF$_2)_2$—O—CF$_2$—CF=CF$_2$, I—CF$_2$—CF$_2$—O—(CF$_2)_3$—O—CF$_2$—CF=CF$_2$, I—CF$_2$—CF$_2$—O—(CF$_2)_2$—O—CF(CF$_3$)CF$_2$—O—CF$_2$—CF$_2$, I—CF$_2$—CF$_2$—O—(CF$_2)_2$—O—CF(CF$_3$)CF$_2$—O—CF$_2$—CF=CF$_2$, Br—CF$_2$—CF$_2$—O—(CF$_2)_2$—O—CF=CF$_2$, Br—CF$_2$—CF$_2$—O—(CF$_2)_3$—O—CF=CF$_2$, Br—CF$_2$—CF$_2$—O—(CF$_2)_4$—O—CF=CF$_2$, and Br—CF$_2$—CF$_2$—O—(CF$_2)_2$—O—CF$_2$—CF=CF$_2$. Examples of nitrile containing cure site monomers correspond to the following formula: $CF_2$=CF—CF$_2$—O—Rf-CN; $CF_2$=CFO(CF$_2)_r$CN; $CF_2$=CFO[CF$_2$CF(CF$_3$)O]$_p$(CF$_2)_v$OCF(CF$_3$)CN; and $CF_2$=CF[OCF$_2$CF(CF$_3$)]$_k$O(CF$_2)_u$CN; wherein, r represents an integer of 2 to 12; p represents an integer of 0 to 4; k represents 1 or 2; v represents an integer of 0 to 6; u represents an integer of 1 to 6; and Rf is a perfluoroalkylene or a bivalent perfluoroether group. Specific examples of nitrile containing fluorinated monomers include, but are not limited to, perfluoro (8-cyano-5-methyl-3,6-dioxa-1-octene), $CF_2$=CFO(CF$_2)_5$CN, and $CF_2$=CFO(CF$_2)_3$OCF(CF$_3$)CN.

In one embodiment, the fluorinated polymer of the present disclosure comprises at least 0.1, 0.3, 0.5, 1, 2, or even 2.5 wt % of iodine, bromine, and/or nitrile groups versus the total weight of fluorinated polymer. In one embodiment, the fluorinated polymer comprises no more than 1, 2, 3, 5, or even 10 wt % of iodine, bromine, and/or nitrile groups versus the total weight of the fluorinated polymer.

As used herein the phrase "fluorinated elastomeric gum" refers to a fluoropolymer that can be processed as a traditional elastomer. To be processed as a traditional elastomer means that the fluoropolymer can be processed with a two-roll mill or an internal mixer. Mill blending is a process that rubber manufacturers use to combine the polymer gum with the requisite curing agents and/or additives. In order to be mill blended, the fluorinated elastomeric gum must have a sufficient modulus. In other words, not too soft that it sticks to the mill, and not too stiff that it cannot be banded onto mill. In one embodiment, the fluorinated elastomeric gum of the present disclosure has a modulus of at least 0.1, 0.3, or even 0.5 MPa (megaPascals); and at most 2.5, 2.2, or even 2.0 MPa at 100° C. as measured at a strain of 1% and a frequency of 1 Hz (Hertz).

The fluorinated elastomeric gum may be perfluorinated or partially fluorinated. As disclosed herein, in a perfluorinated polymer, the carbon-hydrogen bonds along the fluorinated polymer are all replaced with carbon-fluorine bonds and optionally some carbon-chlorine and/or carbon-bromine bonds. It is noted this absence of C—H bonds excludes the sites of initiation and termination of the polymer. As disclosed herein, in a partially fluorinated polymer, the polymer comprises at least one carbon-hydrogen bond and at least one carbon-fluorine bond in the polymer excluding the sites of initiation and termination of the polymer. In one embodiment, the fluorinated polymer is highly fluorinated, wherein at least 50, 60, 70, 80, or even 85% of the polymer backbone comprises C—F bonds and at most 90, 95, or even 99%. In one embodiment, the fluorinated polymer is highly fluorinated, wherein at least 75, 80, or even 85% of the C—H bonds of the polymer are replaced by C—F bonds. Generally, at most 90, 95, or even 99% of the C—H bonds of the polymer are replaced by C—F bonds in the highly fluorinated polymer. In one embodiment, the fluorinated polymer comprises no C—H bonds.

In one embodiment, the fluorinated polymer may be derived from one or more fluorinated monomer(s) such as TFE (tetrafluoroethylene), VF (vinyl fluoride), VDF (vinylidene fluoride), HFP (hexafluoropropylene), pentafluoropropylene, trifluoroethylene, CTFE (chlorotrifluoroethylene), perfluoro ethers, and combinations thereof.

Exemplary perfluoro ether monomers are of the Formula (II)

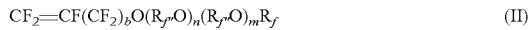

$$CF_2=CF(CF_2)_bO(R_{f'}O)_n(R_{f''}O)_mR_f \qquad (II)$$

where $R_{f'}$, and $R_{f''}$ are independently linear or branched perfluoroalkylene radical groups comprising 2, 3, 4, 5, or 6 carbon atoms; m and n are independently an integer selected from 0, 1, 2, 3, 4, 5, 6, 7, 8, 9, and 10; b is 0 or 1; and $R_f$ is a perfluoroalkyl group comprising 1, 2, 3, 4, 5, or 6 carbon atoms. Exemplary perfluoroalkyl vinyl ether monomers include: perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, perfluoro-methoxy-methylvinylether ($CF_3$—O—$CF_2$—O—CF=$CF_2$), and $CF_3$—($CF_2$)$_2$—O—CF($CF_3$)—$CF_2$—O—CF($CF_3$)—$CF_2$—O—CF=$CF_2$. Exemplary perfluoroalkyl allyl ether monomers include: perfluoro (methyl allyl) ether ($CF_2$=CF—$CF_2$—O—$CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3$—($CF_2$)$_2$—O—CF($CF_3$)—$CF_2$—O—CF($CF_3$)—$CF_2$—O—$CF_2$CF=$CF_2$.

It is known by those of skill in the art to modify the fluorinated elastomeric gum during the polymer formation by the addition of small amounts of other copolymerizable monomers, which may or may not contain fluorine substitution, e.g. ethylene, propylene, butylene and the like. Use of these additional monomers (i.e., comonomers) is within the scope of the present disclosure. Generally, these additional monomers would be used at less than 25 mole percent of the fluoropolymer, preferably less than 10 mole percent, and even less than 3 mole percent.

In one embodiment, the fluorinated elastomeric gum is a random copolymer, which is amorphous, meaning that there is an absence of long-range order (i.e., in long-range order the arrangement and orientation of the macromolecules beyond their nearest neighbors is understood). An amorphous fluoropolymer has no detectable crystalline character by DSC (differential scanning calorimetry), meaning that if studied under DSC, the fluoropolymer would have no melting point or melt transitions with an enthalpy more than 0.002, 0.01, 0.1, or even 1 Joule/g from the second heat of a heat/cool/heat cycle, when tested using a DSC thermogram with a first heat cycle starting at −85° C. and ramped at 10° C./min to 350° C., cooling to −85° C. at a rate of 10° C./min and a second heat cycle starting from −85° C. and ramped at 10° C./min to 350° C. Exemplary amorphous random copolymers may include: copolymers comprising TFE and perfluorinated vinyl ethers monomeric units (such as copolymers comprising TFE and PMVE, and copolymers comprising TFE and PEVE); copolymers comprising TFE and perfluorinated allyl ethers monomeric units; copolymers comprising TFE and propylene monomeric units; copolymers comprising TFE, propylene, and VDF monomeric units; copolymers comprising VDF and HFP monomeric units; copolymers comprising TFE, VDF, and HFP monomeric units; copolymers comprising TFE and ethyl vinyl ether (EVE) monomeric units; copolymers comprising TFE and butyl vinyl ether (BVE) monomeric units; copolymers comprising TFE, EVE, and BVE monomeric units; copolymers comprising VDF and perfluorinated vinyl ethers monomeric units (such as copolymers comprising VDF and $CF_2$=CFO$C_3F_7$) monomeric units; an ethylene and HFP monomeric units; copolymers comprising CTFE and VDF monomeric units; copolymers comprising TFE and VDF monomeric units; copolymers comprising TFE, VDF and perfluorinated vinyl ethers monomeric units (such as copolymers comprising TFE, VDF, and PMVE) monomeric units; copolymers comprising VDF, TFE, and propylene monomeric units; copolymers comprising TFE, VDF, PMVE, and ethylene monomeric units; copolymers comprising TFE, VDF, and perfluorinated vinyl ethers monomeric units (such as copolymers comprising TFE, VDF, and $CF_2$=CFO($CF_2$)$_3$O$CF_3$) monomeric units; and combinations thereof. In one embodiment, the fluorinated polymer is not a copolymer comprising VDF and HFP monomeric units.

In one embodiment, the fluorinated elastomeric gum is a block copolymer in which chemically different blocks or sequences are covalently bonded to each other, wherein the blocks have different chemical compositions and/or different glass transition temperatures. In one embodiment, the block copolymer comprises a first block, A block, which is a semi-crystalline segment. If studied under a differential scanning calorimetry (DSC), this block would have at least one melting point temperature ($T_m$) of greater than 70° C. and a measurable enthalpy, for example, greater than 0 J/g (Joules/gram). The second block, or B block, is an amorphous segment, meaning that there is an absence of long-range order (i.e., in long-range order the arrangement and orientation of the macromolecules beyond their nearest neighbors is understood). The amorphous segment has no detectable crystalline character by DSC. If studied under DSC, the B block would have no melting point or melt transitions with an enthalpy more than 2 milliJoules/g by DSC. In one embodiment, the A block is copolymer derived from at least the following monomers:

tetrafluoroethylene (TFE), hexafluoropropylene (HFP), and vinylidene fluoride (VDF). In one embodiment, the A block comprises 30-85 wt (weight) % TFE; 5-40 wt % HFP; and 5-55 wt % VDF; 30-75 wt % TFE; 5-35 wt % HFP; and 5-50 wt % VDF; or even 40-70 wt % TFE; 10-30 wt % HFP; and 10-45 wt % VDF. In one embodiment, the B block is a copolymer derived from at least the following monomers: hexafluoropropylene (HFP), and vinylidene fluoride (VDF). In one embodiment, the B block comprises 25-65 wt % VDF and 15-60 wt % HFP; or even 35-60 wt % VDF and 25-50 wt % HFP. Monomers, in addition, to those mentioned above, may be included in the A and/or B blocks. Generally, the weight average of the A block and B block are independently selected from at least 1000, 5000, 10000, or even 25000 daltons; and at most 400000, 600000, or even 800000 daltons. Such block copolymers are disclosed in U.S. Pat. Publ. Nos. 2018-0194888 (Mitchell et al.), 2018-013553 (Mitchell, et. al), and 2019-0352444 (Mitchell, et al.) and U.S. patent application Ser. No. 16/477,019 filed 12 Jan. 2018 (Mitchell, et. al); all of which are incorporated herein by reference.

In one embodiment, the amount of the compound of Formula I in the curable composition is at least 0.05, 0.1 or even 1 part by weight; and at most 2, 4, 6, or even 10 parts by weight per 100 parts by weight of the fluorinated polymer.

The fluorinated polymer can be cured with a peroxide curing agent. In one embodiment, the peroxide is an organic peroxide, preferably, a tertiary butyl peroxide having a tertiary carbon atom attached to peroxy oxygen.

Exemplary peroxides include: benzoyl peroxide, dicumyl peroxide, di-tert-butyl peroxide, 2,5-di-methyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, O,O'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.), incorporated herein by reference.

The amount of peroxide used generally will be at least 0.1, 0.2, 0.4, 0.6, 0.8, 1, 1.2, or even 1.5; at most 2, 2.25, 2.5, 2.75, 3, 3.5, 4, 4.5, 5, or even 5.5 parts by weight per 100 parts by weight of the fluorinated polymer.

Coagents are reactive additives used to improve the peroxide curing efficiency by rapidly reacting with radicals and potentially suppressing side reactions and/or generating additional crosslinks. The coagent forms a radical through hydrogen abstraction or addition of a radical from the peroxide, which can then react with the polymer through the Br, I, and/or nitrile sites. The coagents are multifunctional polyunsaturated compounds, which are known in the art and include allyl-containing cyanurates, isocyanurates, and phthalates, homopolymers of dienes, and copolymers of dienes and vinyl aromatics. A wide variety of useful coagents are commercially available including di- and tri-allyl compounds, divinyl benzene, vinyl toluene, vinyl pyridine, 1,2-cis-polybutadiene and their derivatives. Exemplary coagents include a diallyl ether of glycerin, triallylphosphoric acid, diallyl adipate, diallylmelamine and triallyl isocyanurate (TAIC), tri(methyl)allyl isocyanurate (TMAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, and mixtures thereof. Exemplary partially fluorinated compounds comprising two terminal unsaturation sites include: $CH_2=CH-R_{f1}-CH=CH_2$ wherein $R_{f1}$ may be a perfluoroalkylene of 1 to 8 carbon atoms and a fluorine-containing TAIC such as those disclosed in U.S. Pat. No. 6,191,233 (Kishine et al.), incorporated herein by reference.

In one embodiment, the curable composition comprises a peroxide and a coagent, wherein the amount of coagent used generally will be at least 0.1, 0.5, or even 1 part by weight per 100 parts by weight of the fluorinated polymer; and at most 2, 2.5, 3, or even 5 parts by weight per 100 parts by weight of the fluorinated polymer.

Curable Compositions and Processing

The curable composition above can also contain a wide variety of additives of the type normally used in the preparation of elastomeric compositions, such as acid acceptors, process aides, pigments, fillers, pore-forming agents, and those known in the art.

Such fillers include: an organic or inorganic filler such as clay, silica ($SiO_2$), alumina, iron red, talc, diatomaceous earth, barium sulfate, wollastonite ($CaSiO_3$), calcium carbonate ($CaCO_3$), calcium fluoride, titanium oxide, iron oxide and carbon black fillers, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the cured product. The filler components may result in a cured product that is capable of retaining a preferred elasticity and physical tensile, as indicated by an elongation and tensile strength value, while retaining desired properties such as retraction at lower temperature (TR-10).

In one embodiment, the curable composition and/or cured product comprises less than 40, 30, 20, 15, or even 10% by weight of the filler.

Conventional adjuvants may also be incorporated into the curable composition of the present disclosure to enhance the properties in the resulting cured product. For example, acid acceptors may be employed to facilitate the cure and thermal stability of the compound. Suitable acid acceptors include those known in the art, such as magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amounts ranging from at least 1, 2, 4, or even 5%; and at most 10, 15, or even 20% weight per weight of the fluorinated polymer.

In one embodiment, the curable composition (and the resulting cured article) is substantially free of inorganic acid acceptors, meaning that the curable composition (or resulting cured article) contains less than 0.5, 0.1, 0.05, 0.01% be weight per weight of the fluorinated polymer, or even no inorganic acid acceptor.

The curable fluoropolymer compositions may be prepared by mixing the phthalonitrile-containing compound of Formula I, the fluoropolymer, and any additional components in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting fluorinated polymer "compound" or polymer sheets. The "compound" can then be extruded or pressed in a mold, e.g., a cavity or a transfer mold and subsequently be oven-cured. In an alternative embodiment, curing can be done in an autoclave.

Pressing of the compounded mixture (i.e., press cure) is typically conducted at a temperature of about 120-220° C., preferably about 140-200° C., for a period of about 1 minute to about 15 hours, usually for about 1-15 minutes. A pressure of about 700-20,000 kPa, preferably about 3400-6800 kPa, is typically used in molding the composition. The molds first may be coated with a release agent and prebaked.

The molded vulcanizate can be post cured in an oven at a temperature of about 140-240° C., preferably at a temperature of about 160-230° C., for a period of about 1-24 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

In one embodiment of the present disclosure, after curing the curable composition of the present disclosure, the resulting fluoroelastomer has improved thermal aging as shown by better retention of elongation and/or tensile after heat aging. The retained elongation at break can be determined by examining the elongation at break before and after heat aging. The retained elongation is reported as the difference between the aged sample versus the initial sample. For example, if the elongation at break was initially 200% and after heat aging it was 500%, then the retained elongation would be 300%. In this calculation, a smaller difference in retained elongation indicates greater retention of properties. In one embodiment, the retained elongation is no more than 450, 400, 350, 300, 250, 200, or even 150%. The % retained tensile at break can be determined by examining the tensile stress at break before and after heat aging. The retained tensile is reported as the ratio of the tensile stress at break after heat aging divided by the initial tensile stress at break and multiplying this ration by 100%. For example, if the tensile stress at break was initially 20 MPa and the tensile stress at break after heat aging was 15 MPa, the % Retained Tensile value would be 75%. In one embodiment, the cured fluoroelastomer of the present disclosure has a % retained tensile at break, which is at least 15, 17, 20, 25 or even 30%. In one embodiment, the % retained tensile is at least 15, 20, 25, 50, 75, 100, or even 125% greater than the same fluoroelastomer not made with the compound of Formula I.

The cured fluoroelastomer is particularly useful as o-rings, hoses, seals, gaskets, sheets, and molded parts in automotive, chemical processing, semiconductor, aerospace, and petroleum industry applications, among others.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Millipore, Saint Louis, Mo., or may be synthesized by conventional methods.

The following abbreviations are used in this section: g=gram, cm=centimeter, min=minute, h=hour, NMR=nuclear magnetic resonance, ° C.=degrees Celsius, ° F.=degrees Fahrenheit, MPa=megapascals, mol=mole, mL=milliliter, MHz=megaHertz, DSC=differential scanning calorimetry, FTIR=Fourier transform infrared, ATR=attenuated total reflection, and v/v=volume per volume. Abbreviations for materials used in this section, as well as descriptions of the materials, are provided in Table 1.

TABLE 1

| Abbreviation | Description |
|---|---|
| Fluoropolymer A | A perfluoroelastomer derived from about 49.2% of TFE, 50.3% of PMVE and 0.5% of $CF_2=CFO(CF_2)_3O(CF_2)_2I$ by weight, 72.2% fluorine content by weight, 0.31% iodine content by weight and Mooney Viscosity ML1 + 10 @ 121° C. of 35. |
| Fluoropolymer B | A fluoroelastomer derived from 23 wt % tetrafluoroethylene (TFE), 41 wt % hexafluoropropylene (HFP) and 36 wt % vinylidene fluoride (VDF) monomer with 70 wt % fluorine content, 0.3 wt % iodine content and Mooney Viscosity ML1 + 10 @ 121° C. of 20. |
| Carbon Black | N990 Carbon black commercially available from Cancarb Ltd, Medicine Hat, Alta., Canada |
| Coagent | Triallyl-isocyanurate commercially available under the trade designation "TAIC" from Nippon Kasei Chemical Co. Ltd., Tokyo, Japan |
| Peroxide | 2,5-dimethyl-2,5-di(t-butylperoxy)-hexane, 50% active, available under the trade designation "VAROX DBPH-50" from Vanderbilt Chemicals, LLC., Norwalk, CT. |
| APPN | 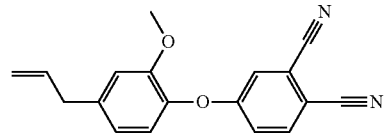 [SMILES: C=CCc1ccc(Oc2ccc(C#N)c(C#N)c2)c(OC)c1]<br>Prepared as described below in PE-1 |
| EuPN | Prepared as described below in PE-2 |

A TA Instruments Q Series DSC (obtained from TA Instruments, New Castle, Del.) was used to measure the dynamic heat flow of the preparatory examples under application of a constant thermal ramp rate. Approximately 5 milligram (mg) of resin was weighed into an aluminum DSC pan. The sample pan was loaded into the DSC instrument, and the heat flow of the sample was measured in a dynamic DSC measurement with a thermal ramp rate of 1 degree Celsius per minute (° C./min) from 25° C. to 200° C. The melting point temperature ($T_m$) was measured as the peak temperature of the endothermic heat flow process.

Compounding 200 g polymer batches were compounded with the amounts of materials as listed in Tables 2 and 3 on a two-roll mill.

Physical Properties

Tensile Data

Tensile data was gathered from post cured samples cut to Die D specifications at room temperature in accordance with ASTM 412-06A. These samples were press cured for 10 min at 177° C. (350° F.). Heat aged tensile data was measured on Die D dumbbells. The difference in elongation at break and the % retained elongation at break after heat aging was determined as described above. Results are reported in Tables 2 and 3.

Molding O-Rings and Compression Set

O-rings (214, AMS AS568) were molded at 177° C. for 10 min. The press cured O-rings were post-cured at 232° C. for 4 h. The press cured and post cured O-rings were tested for compression set for 70 h at 200° C. in accordance with ASTM D 395-03 Method B and ASTM D 1414-94 with 25% initial deflection. Results are reported as percentages in Tables 3, 4 and 5.

Preparative Example 1 (PE-1)

4-(2-allylphenoxy)phthalonitrile (APPN) was derived from the nucleophilic substitution reaction of 4-nitrophthalonitrile and 2-allylphenol. To a three necked 5000 mL reaction flask was added 400 g (2.31 mol) of 4-nitrophthalonitrile, 310.0 g (2.31 mol) of 2-allylphenol, 400 g (2.89 mol) of anhydrous $K_2CO_3$, and 2250 g of dry dimethyl sulfoxide (DMSO) and stirred for 48 h at room temperature under a nitrogen atmosphere. The reaction solution was filtered through a Buchner funnel with Whatman #4 filter paper to remove undissolved salts. The filtered solution was added slowly to 4000 mL of cold methanol/water (60/40 by mass) cooled to a temperature below −25° C. that was mechanically stirred by a glass stir shaft fitted with a PTFE (perfluorotetrafluoroethylene) stir blade. The temperature of the methanol/water solution was maintained below −15° C. during the addition of the reaction solution. Addition of the reaction solution resulted in precipitation of the product. The product was collected by vacuum filtration using a benchtop Buchner type filter with Whatman #4 filter paper and washed with 2000 mL of ambient temperature methanol/water (60/40 by mass). The liquid was collected and dried in a convection oven set at 120° C. The resin crystallized upon cooling. The product, 495 g (82.3%), had a melt temperature of 63° C. as measured by differential scanning calorimetry, and was identified by infrared and NMR analysis.

DSC $T_m$=63° C. FTIR (ATR; cm$^{-1}$): 2231 (—CN), 1639 (—C═C), 1247 (C—O—C). $^1$H NMR (500 MHz, CDCl$_3$ with 0.05% v/v tetramethylsilane (TMS); δ, ppm): 7.72 (d, 1H), 7.37 (d, 1H), 7.31 (m, 2H), 7.21 (s, 1H), 7.19 (d, 1H), 6.99 (d, 1H), 5.84 (m, 1H), 5.02 (d, 1H), 4.96 (d, 1H), 3.28 (d, 2H). $^{13}$C NMR (500 MHz, CDCl$_3$ with 0.05% v/v TMS; δ, ppm): 161.79, 151.19, 135.42, 135.36, 132.42, 131.62, 128.54, 126.77, 121.09, 120.91, 120.86, 117.62, 116.75, 115.43, 115.01, 108.56, 34.08.

Preparative Example 2 (PE-2)

4-(2-methoxy-4-allylphenoxy)phthalonitrile (EuPN) was derived from the nucleophilic substitution reaction of 4-nitrophthalonitrile and 2-methoxy-4-allylphenol. To a three necked 5000 mL reaction flask was added 400 g (2.31 mol) of 4-nitrophthalonitrile, 379.4 g (2.31 mol) of 2-methoxy-4-allylphenol, 400 g (2.89 mol) of anhydrous $K_2CO_3$, and 2500 g of dry DMSO) and stirred for 48 h at room temperature under a nitrogen atmosphere. The reaction solution was filtered through a Buchner funnel with Whatman #4 filter paper to remove undissolved salts. The filtered solution was added slowly to 4000 mL of ice cold methanol/water (60/40 by mass prepared by pouring 2080 g of methanol over 1400 g of ice) that was mechanically stirred by a glass stir shaft fitted with a PTFE stir blade. Addition of the reaction solution resulted in precipitation of the product. The product was collected by vacuum filtration using a benchtop Buchner type filter with Whatman #4 filter paper and washed with 2000 mL of ambient temperature methanol/water (60/40 by mass). The product cake was scooped into an aluminum pan and placed in a convection oven set at 130° C. overnight to dry. The resin crystallized upon cooling. The product, 528 g (78.7%), had a melt temperature of 100° C. as measured by differential scanning calorimetry, and was identified by infrared and NMR analysis.

DSC $T_m$=100° C. FTIR (ATR; cm$^{-1}$): 2227 (—CN), 1636 (—C═C), 1244 (C—O—C). $^1$H NMR (500 MHz, CDCl$_3$ with 0.05% v/v TMS; δ, ppm): $^1$H NMR (500 MHz, CDCl$_3$ with 0.05% v/v TMS; δ, ppm): 7.69 (d, 1H), 7.18 (d, 1H), 7.17 (s, 1H), 7.02 (d, 1H), 6.88 (s, 1H), 6.85 (d, 1H), 5.99 (m, 1H), 5.16 (d, 1H), 5.13 (d, 1H), 3.77 (s, 3H), 3.43 (d, 2H). $^{13}$C NMR (500 MHz, CDCl$_3$ with 0.05% v/v TMS; δ, ppm): 161.94, 151.03, 140.01, 139.48, 136.65, 135.14, 122.33, 121.47, 120.46, 120.34, 117.29, 116.60, 115.62, 115.23, 113.34, 108.18, 55.76, 40.07.

TABLE 2

| | Example or Counter Example | | |
|---|---|---|---|
| | CE-1 | EX-1 | EX-2 |
| Fluoropolymer A | 100 | 100 | 100 |
| Carbon Black | 30 | 30 | 30 |
| Coagent | 3 | 3 | 3 |
| Peroxide | 2 | 2 | 2 |
| APPN | | 2 | |
| EuPN | | | 2 |
| Physical Properties after Post Cure 250° C., 16 h | | | |
| Tensile, MPa | 21.0 | 19.0 | 21.6 |
| Elongation at break, % | 169 | 144 | 148 |
| 50% Modulus, MPa | 4.9 | 7.3 | 7.5 |
| 100% Modulus, MPa | 11.8 | 13.6 | 14.7 |
| Hardness | 81 | 89 | 89 |
| Heat Aged at 300° C. (572° F.), 70 h | | | |
| Tensile, MPa | 3.0 | 4.8 | 4.0 |
| Elongation at break, % | 776 | 483 | 545 |
| 50% Modulus, MPa | 2.5 | 4.1 | 3.1 |
| 100% Modulus, MPa | 3.1 | 4.5 | 3.3 |
| Hardness | 78 | 85 | 87 |
| % Retained Tensile | 14 | 25 | 19 |
| Difference in Elongation (%) | 607 | 339 | 397 |
| Compression Set after Post Cure 70 h at 200° C. | 20 | 27 | 23 |

As Shown in Table 2, the samples comprising the compound of Formula I both showed better retention of tensile at break and elongation at break after heat aging than CE-1.

TABLE 3

| | Example or Counter Example | | |
|---|---|---|---|
| | CE-2 | EX-3 | EX-4 |
| Fluoropolymer B | 100 | 100 | 100 |
| Carbon Black | 30 | 30 | 30 |
| Coagent | 3 | 3 | 3 |
| Peroxide | 2 | 2 | 2 |
| APPN | | 2 | |
| EuPN | | | 2 |
| Physical Properties after Post Cure 250° C., 16 h | | | |
| Tensile, MPa | 21.7 | 16.4 | 16.5 |
| Elongation at break, % | 220 | 193 | 179 |
| 50% Modulus, MPa | 2.4 | 2.8 | 2.6 |

TABLE 3-continued

| | Example or Counter Example | | |
|---|---|---|---|
| | CE-2 | EX-3 | EX-4 |
| 100% Modulus, MPa | 6.3 | 6.3 | 6.4 |
| Hardness | 71 | 78 | 76 |
| Heat Aged at 270° C. (518° F.), 70 h | | | |
| Tensile, MPa | 10.2 | 12.2 | 12.0 |
| Elongation at break, % | 350 | 275 | 292 |
| 50% Modulus, MPa | 1.5 | 2.4 | 2.0 |
| 100% Modulus, MPa | 2.4 | 4.0 | 3.2 |
| Hardness | 69 | 74 | 75 |
| % Retained Tensile | 47 | 74 | 73 |
| Difference in Elongation (%) | 130 | 82 | 113 |
| Compression Set after Post Cure 70 h at 200° C. | 26 | 40 | 33 |

As Shown in Table 3, the samples comprising the compound of Formula I both showed better retention of tensile at break and elongation at break after heat aging than CE-2.

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A curable composition comprising (a) a fluorinated elastomeric gum comprising a fluoropolymer, wherein the fluoropolymer comprises at least one of —I, —Br, and —CN cure site, (b) a peroxide curing system comprising a peroxide and a coagent, and (c) a compound of formula I

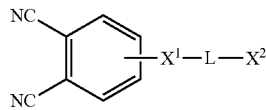

wherein $X^1$ is selected from O or S; L is a divalent linking group comprising at least one aromatic ring; and $X^2$ comprises a carbon-carbon double bond.

2. The curable composition of claim 1, wherein the coagent comprises at least one of (i) diallyl ether of glycerin, (ii) triallylphosphoric acid, (iii) diallyl adipate, (iv) diallylmelamine and triallyl isocyanurate, (v) tri(methyl)allyl isocyanurate, (vi) tri(methyl)allyl cyanurate, (vii) poly-triallyl isocyanurate, (viii) xylylene-bis(diallyl isocyanurate), and (xi) $CH_2$=CH-Rf1-CH=$CH_2$ wherein Rf1 is a perfluoroalkylene of 1 to 8 carbon atoms.

3. The curable composition of claim 1, wherein the peroxide comprises at least one of 2,5-dimethyl-2,5-di(t-butylperoxy)hexane; dicumyl peroxide; di(2-t-butylperoxy-isopropyl)benzene; dialkyl peroxide; bis (dialkyl peroxide); 2,5-dimethyl-2,5-di(tertiarybutylperoxy)3-hexyne; dibenzoyl peroxide; 2,4-dichlorobenzoyl peroxide; tertiarybutyl perbenzoate; α,α'-bis(t-butylperoxy-diisopropylbenzene); t-butyl peroxy isopropylcarbonate, t-butyl peroxy 2-ethylhexyl carbonate, t-amyl peroxy 2-ethylhexyl carbonate, t-hexylperoxy isopropyl carbonate, di [1,3-dimethyl-3-(t-butylperoxy)butyl] carbonate, carbonoperoxoic acid, and O,O'-1,3-propanediyl OO,OO'-bis(1,1-dimethylethyl) ester.

4. The curable composition of claim 1, wherein the fluorinated elastomeric gum comprises at least one of: (i) a copolymer comprising tetrafluoroethylene, vinylidene fluoride, and hexafluoropropylene monomeric units; (ii) a copolymer comprising tetrafluoroethylene, and propylene monomeric units; (iii) a copolymer comprising tetrafluoroethylene, vinylidene fluoride, and propylene monomeric units; and (iv) a copolymer comprising vinylidene fluoride, perfluoro (methyl vinyl) ether, and hexafluoropropylene monomeric units; (v) a copolymer comprising tetrafluoroethylene, vinyl fluoride, and hexafluoropropylene monomeric units; (vi) a copolymer comprising vinyl fluoride, perfluoro (methyl vinyl) ether, and hexafluoropropylene monomeric units; (vii) a copolymer of tetrafluoroethylene with perfluorovinyl ether, and (viii) a copolymer of tetrafluoroethylene with perfluoroallyl ether.

5. The curable composition of claim 1, comprising at least 0.05 parts by weight of the compound of formula I per 100 parts of the fluorinated polymer.

6. The curable composition of claim 1, wherein L comprises an aromatic 6-membered ring.

7. The curable composition of claim 6, wherein L is

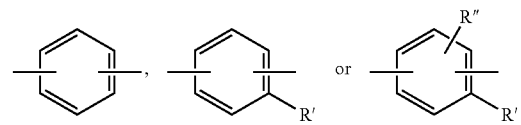

wherein R' and R" are independently selected from a methyl, a methoxy, an ethyl, an ethoxy, a propyl, a propoxy, a butyl, or a butoxy group.

8. The curable composition of claim 6, wherein L is

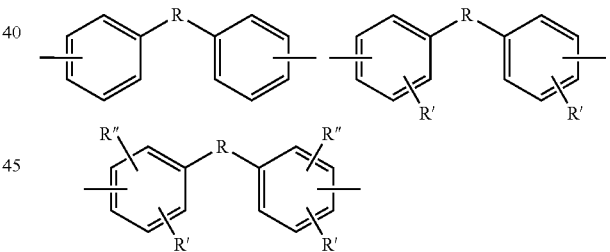

wherein R is selected from —S—, —O—, —C(CF$_3$)$_2$-, —C(CH$_3$)$_2$-, —CH$_2$-, —SO$_2$-, —C(=O)—, or -C(CH$_3$)$_2$—C$_6$H$_4$—C(CH$_3$)$_2$—; each R' and each R" are independently selected from a methyl, a methoxy, an ethyl, an ethoxy, a propyl, a propoxy, a butyl, or a butoxy group.

9. The curable composition of claim 1, wherein L comprises an aromatic 5-membered ring.

10. The curable composition of claim 9, wherein the aromatic 5-membered ring comprises at least one of a pyrrole, a furan, an imidazole, a pyridine, and a thiophene.

11. The curable composition of claim 1, wherein $X^2$ comprises at least one of: —CH=CH$_2$, —CH$_2$CH=CH$_2$, —OCH=CH$_2$, —OCH$_2$CH=CH$_2$, —OCH$_2$C(CH$_3$)=CH$_2$, —C(CH$_3$)=CH$_2$, and —OCF=CF$_2$.

12. The curable composition of claim 1, wherein L comprises a divalent benzene.

13. The curable composition of claim 1, wherein -L-X² is
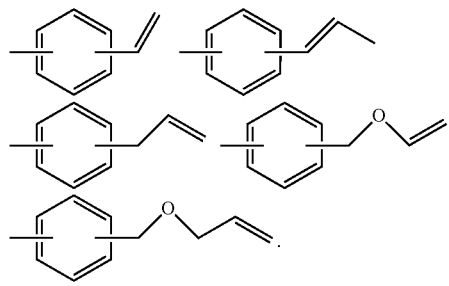
14. The curable composition of claim 1, wherein the fluorinated elastomeric gum is amorphous.
15. A cured article derived from the curable composition of claim 1.
16. The cured article of claim 15, wherein the article is an o-ring, a seal, a gasket, a hose, or a sheet.
* * * * *